United States Patent
Eddy et al.

(10) Patent No.: US 11,047,766 B2
(45) Date of Patent: Jun. 29, 2021

(54) SYSTEMS AND METHODS FOR IDENTIFICATION AND TESTING OF OPTICAL FIBERS

(71) Applicant: AFL Telecommunications LLC, Duncan, SC (US)

(72) Inventors: Dale Eddy, Gilford, NH (US); Scott Prescott, Belmont, NH (US); Lee Woodworth, Penacook, NH (US)

(73) Assignee: AFL Telecommunications LLC, Duncan, SC (US)

( * ) Notice: Subject to any disclaimer, the term of this patent is extended or adjusted under 35 U.S.C. 154(b) by 226 days.

(21) Appl. No.: 15/950,759

(22) Filed: Apr. 11, 2018

(65) Prior Publication Data

US 2019/0316987 A1    Oct. 17, 2019

(51) Int. Cl.
*G01M 11/00* (2006.01)
*G01M 11/08* (2006.01)

(52) U.S. Cl.
CPC .......... *G01M 11/30* (2013.01); *G01M 11/088* (2013.01); *G01M 11/3118* (2013.01); *G01M 11/3136* (2013.01)

(58) Field of Classification Search
CPC .............. G01M 11/088; G01M 11/30; G01M 11/3118; G01M 11/3136; G02B 6/4286; H04B 10/071; G01R 31/60
See application file for complete search history.

(56) References Cited

U.S. PATENT DOCUMENTS

| | | | |
|---|---|---|---|
| 3,644,687 A | 2/1972 | Richards, Jr. | |
| 3,678,250 A | 7/1972 | Dethloff et al. | |
| 3,681,686 A | 8/1972 | Connally | |
| 3,742,350 A * | 6/1973 | White | G01R 31/60 324/66 |
| 4,356,395 A | 10/1982 | Miller | |
| 4,442,550 A | 4/1984 | Killat | |
| 4,445,086 A | 4/1984 | Bulatao | |
| 4,937,519 A | 6/1990 | Fields, III | |
| 4,994,675 A | 2/1991 | Levin et al. | |
| 5,013,908 A | 5/1991 | Chang | |
| 5,027,074 A | 6/1991 | Haferstat | |

(Continued)

FOREIGN PATENT DOCUMENTS

| DE | 3812143 A | 10/1989 |
|---|---|---|
| DE | 10321756 B3 | 12/2004 |

(Continued)

OTHER PUBLICATIONS

AFL Telecommunications LLC OFI 200 Optical Fiber Identifier, NOYES Fiber Systems, OFII-11-2000, Revision C, Oct. 14, 2011.

(Continued)

*Primary Examiner* — Violeta A Prieto
(74) *Attorney, Agent, or Firm* — Dority & Manning, P.A.

(57) ABSTRACT

A method of identifying and testing an optical fiber includes emitting light into the optical fiber. The light includes an identification signal and a testing signal. The method also includes reading the identification signal and the testing signal with a single device. The method further includes determining an identity of the optical fiber based on the identification signal with the single device and determining a status of the optical fiber based on the testing signal with the single device.

18 Claims, 7 Drawing Sheets

(56) References Cited

U.S. PATENT DOCUMENTS

| | | | |
|---|---|---|---|
| 5,187,362 A * | 2/1993 | Keeble | G01M 11/3136 |
| | | | 250/227.15 |
| 5,196,899 A | 3/1993 | Serwatka | |
| 5,329,348 A | 7/1994 | Nimura et al. | |
| 5,394,503 A * | 2/1995 | Dietz, Jr. | G02B 6/3817 |
| | | | 385/134 |
| 5,424,831 A | 6/1995 | Kossat et al. | |
| 5,436,987 A | 7/1995 | Saito et al. | |
| 5,506,674 A | 4/1996 | Inoue et al. | |
| 5,519,795 A | 5/1996 | Bender et al. | |
| 5,708,499 A | 1/1998 | Baden et al. | |
| 5,859,695 A | 1/1999 | Nelson et al. | |
| 6,094,261 A | 7/2000 | Contarino, Jr. | |
| 6,269,204 B1 | 7/2001 | Ishikawa | |
| 6,466,885 B2 | 10/2002 | Miller, Jr. | |
| 6,590,659 B2 | 7/2003 | Melnyk et al. | |
| 6,614,968 B1 | 9/2003 | Eslambolchi et al. | |
| 6,643,436 B2 | 11/2003 | Flatt | |
| 6,888,996 B2 | 5/2005 | Hwang et al. | |
| 7,054,556 B2 | 5/2006 | Wan et al. | |
| 7,113,267 B1 | 9/2006 | Suzuki et al. | |
| 7,127,041 B1 * | 10/2006 | Houck | H04M 1/24 |
| | | | 379/25 |
| 7,808,621 B2 | 10/2010 | Russell | |
| 7,916,983 B2 | 3/2011 | Sanderson et al. | |
| 9,880,069 B1 * | 1/2018 | Adam | G01M 11/33 |
| 2002/0076176 A1 | 6/2002 | Flatt | |
| 2005/0041902 A1 | 2/2005 | Frigo | |
| 2005/0041983 A1 | 2/2005 | Bissessur | |
| 2005/0105905 A1 | 5/2005 | Ovadia et al. | |
| 2005/0146711 A1 | 7/2005 | Suino | |
| 2005/0150962 A1 | 7/2005 | Colombo et al. | |
| 2008/0024769 A1 | 1/2008 | Frigo | |
| 2008/0052603 A1 | 2/2008 | Wiatrowski et al. | |
| 2008/0297773 A1 | 12/2008 | Blair et al. | |
| 2009/0028490 A1 * | 1/2009 | Sanderson | G02B 6/4289 |
| | | | 385/12 |
| 2009/0220239 A1 | 9/2009 | Armstrong et al. | |
| 2009/0268197 A1 | 10/2009 | Perron et al. | |
| 2010/0238428 A1 * | 9/2010 | Glines | G01M 11/332 |
| | | | 356/73.1 |
| 2011/0085158 A1 | 4/2011 | Motter et al. | |
| 2011/0153543 A1 * | 6/2011 | Woodward | G01M 11/3172 |
| | | | 706/54 |
| 2011/0153544 A1 * | 6/2011 | Nagel | G01M 11/3136 |
| | | | 706/54 |
| 2011/0158580 A1 * | 6/2011 | Sanderson | G01M 11/088 |
| | | | 385/12 |
| 2012/0140207 A1 | 6/2012 | Dinjian et al. | |
| 2014/0177657 A1 * | 6/2014 | Bowcutt | H04B 10/077 |
| | | | 370/535 |
| 2015/0208146 A1 * | 7/2015 | Younce | H04J 14/0212 |
| | | | 398/21 |
| 2021/0001139 A1 * | 1/2021 | Shukla | A61N 2/02 |

FOREIGN PATENT DOCUMENTS

| | | |
|---|---|---|
| JP | 62-222129 | 9/1987 |
| JP | 02234039 | 9/1990 |
| JP | 06094572 A | 4/1994 |
| JP | 2003004971 A | 1/2003 |
| WO | WO/1990/006498 | 6/1990 |
| WO | 09-127362 | 5/1997 |
| WO | WO2008064064 A2 | 5/2008 |
| WO | WO/2012/167334 | 12/2012 |

OTHER PUBLICATIONS

AFL Telecommunications LLC; International Patent Application No. PCT/US2019/026527; International Search Report; dated Jul. 22, 2019; (2 pages).

* cited by examiner

US 11,047,766 B2

SYSTEMS AND METHODS FOR IDENTIFICATION AND TESTING OF OPTICAL FIBERS

FIELD

The present disclosure relates to optical fibers. In particular, the present disclosure relates to methods for identifying and testing one or more optical fibers.

BACKGROUND

Present means and methods of identifying an optical fiber, such as an optical ribbon fiber, individual fibers within a cable, or fibers broken out from an optical fiber cable usually require one or more optical light sources and either an optical power meter or an optical live fiber identifier. Such methods, however, do not also provide accurate power measurement. In order to accurately measure power according to known methods requires at least two distinct actions, identifying an optical fiber with a first device and measuring the power with a second device. Such methods further require connecting and disconnecting these various devices during the test.

Accordingly, improved methods for identifying and testing optical fibers are desirable. For example, optical fiber identification and testing methods which may be performed using a single device to both identify and test an optical fiber would be useful.

BRIEF DESCRIPTION

Aspects and advantages of the invention are set forth below in the following description, or may be obvious from the description, or may be learned through practice of the invention.

In one exemplary aspect of the present disclosure, a method of identifying and testing an optical fiber is provided. The method includes emitting light into the optical fiber. The light includes an identification signal and a testing signal. The method also includes reading the identification signal and the testing signal with a single device. The method further includes determining an identity of the optical fiber based on the identification signal with the single device and determining a status of the optical fiber based on the testing signal with the single device.

In another exemplary aspect of the present disclosure, a method of identifying and testing a plurality of optical fibers is provided. The method includes emitting light into each optical fiber of the plurality of optical fibers. The light includes an identification signal unique to each respective optical fiber of the plurality of optical fibers and a testing signal. The method also includes reading the identification signal and the testing signal with a single device and determining an identity and a status of each optical fiber of the plurality of optical fibers with the single device. The determined identity is based on the identification signal and the determined status is based on the testing signal.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures.

DETAILED DESCRIPTION

Figure 1:
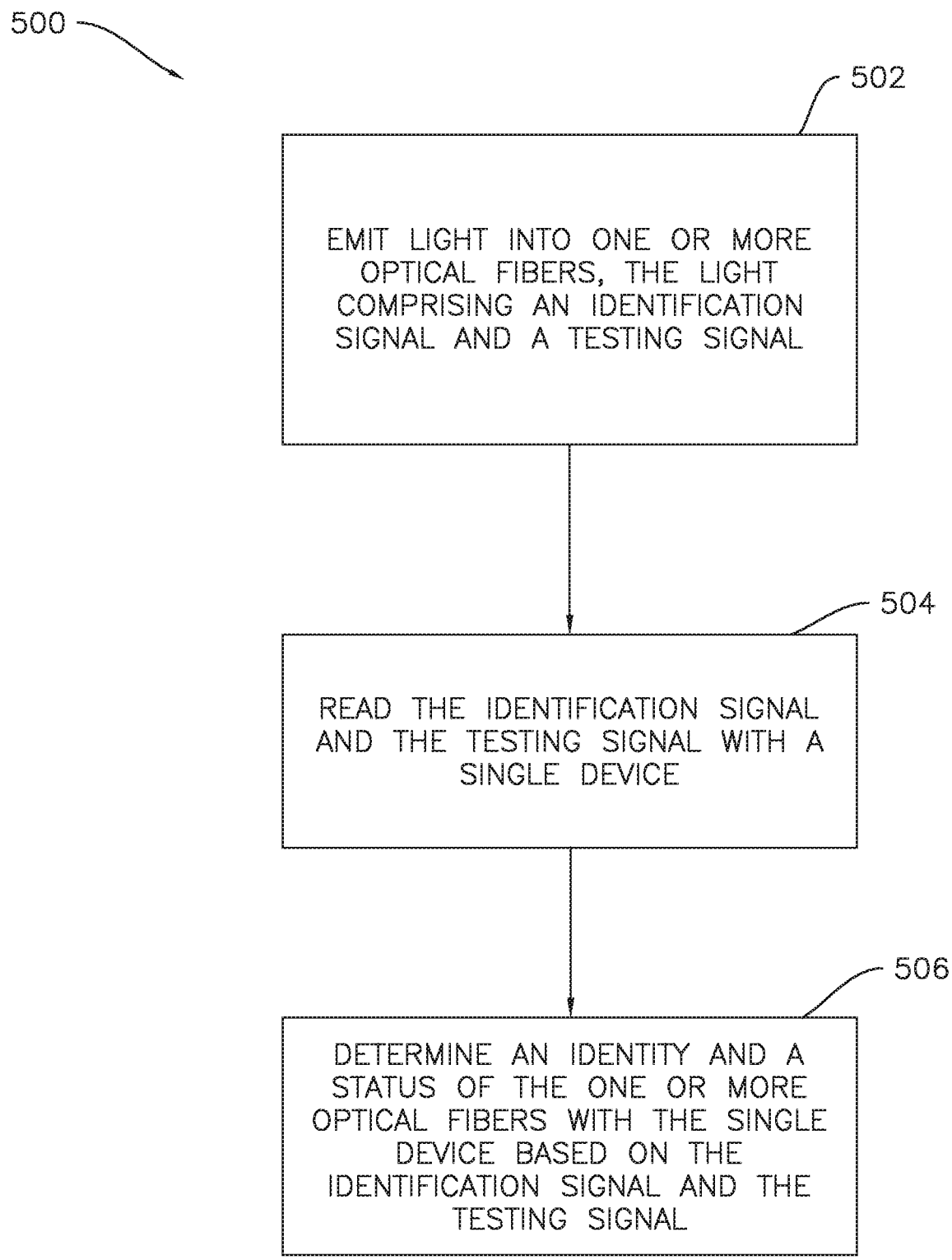
FIG. 1 provides a flow chart of an exemplary method of identifying and testing a plurality of optical fibers according to one or more embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Embodiments of the present subject matter include methods of identifying and testing one or more optical fibers, such as the exemplary method 500 illustrated in FIG. 1. The exemplary method 500 may be usable with any suitable optical fiber(s), such as one or more optical fiber(s) which may be used, e.g., in a ribbon, cable, data cord, etc. The method 500 of identifying and testing one or more optical fibers may include a step 502 of emitting light into one or more optical fibers, e.g., into an end of the one or more optical fibers such that the light propagates through and is transmitted by the one or more optical fibers. For example, in at least some embodiments, the method 500 may include emitting light into each optical fiber of a plurality of optical fibers. The emitted light may include an identification signal and a testing signal. The identification signal may be unique to each respective optical fiber of the plurality of optical fibers. The method 500 may further include a step 504 of reading the identification signal and the testing signal. Both the identification signal and the testing signal may be read with a single device. The method 500 may also include a step 506 determining an identity and a status of the one or more optical fibers, e.g., each optical fiber of the plurality of optical fibers with the single device. The determined identity in step 506 may be based on the identification signal and the determined status may be based on the testing signal. For example, the single device may be configured to determine an identity and a status of each optical fiber of the plurality of optical fibers based on the identification signal and the testing signal, respectively.

Figure 2:
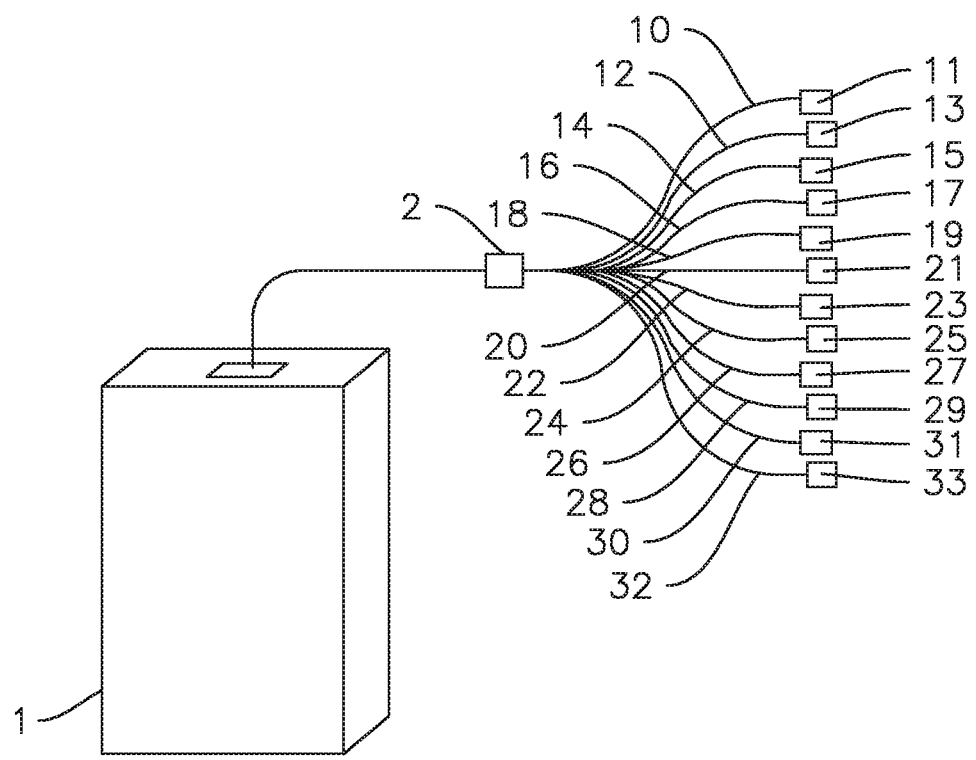
FIG. 2 is a schematic illustration of a plurality of optical fibers which may be identified and tested according to one or more embodiments of the present subject matter.

Any suitable light source may be used to emit the light in various embodiments of the present methods. As one example of a suitable light source, the light may be emitted by a multifiber tracer (MFT), such as the exemplary MFT 1 illustrated in FIG. 2. As illustrated in FIG. 2, the MFT 1 may be connected to a plurality of optical fibers for identifying and testing the optical fibers. In the illustrated example embodiment, the MFT 1 may be connected to twelve optical fibers 10, 12, 14, 16, 18, 20, 22, 24, 26, 28, 30, and 32, e.g., via a fan out connector 2. Accordingly, in some embodiments, the method may include simultaneously testing and identifying multiple optical fibers, e.g., twelve fibers. The plurality of optical fibers may include any suitable numbers of fibers, e.g., two optical fibers, three optical fibers, up to and including twelve or more optical fibers. As used herein, the multiple optical fibers may be tested and identified "simultaneously" in that the testing and identification method may be performed in a single process without a need to disconnect and reconnect various pieces of equipment to and from each optical fiber. One exemplary MFT as may be used in methods of the present subject matter is described in U.S. patent application Ser. No. 12/441,652 of Glines et al. (hereafter, "Glines"), which is incorporated herein by reference.

As shown in FIG. 2, each of the twelve optical fibers 10, 12, 14, 16, 18, 20, 22, 24, 26, 28, 30, and 32 extends from the fan out connector 2 to a respective connector 11, 13, 15, 17, 19, 21, 23, 25, 27, 29, 31, and 33 of each of the plurality of optical fibers. Thus, light from the MFT 1 may be emitted into one or more of the optical fibers 10, 12, 14, 16, 18, 20, 22, 24, 26, 28, 30, and 32 at a first end connected to the fan out 2 and the light may be transmitted through the selected optical fiber or fibers from the first end connected to the fan out 2 to a second end of the respective optical fiber 10, 12, 14, 16, 18, 20, 22, 24, 26, 28, 30, and/or 32 at the corresponding connector(s) 11, 13, 15, 17, 19, 21, 23, 25, 27, 29, 31, and/or 33.

As will be described in more detail below, the light may include an identification signal and a testing signal. Such signals may advantageously both be read by a single device, such that the identification and testing of one or more of a plurality of optical fibers may be performed simultaneously, as mentioned above.

Figure 3:
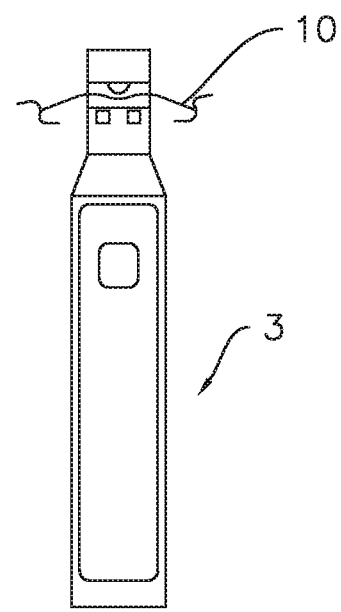
FIG. 3 is a schematic illustration of an exemplary multi-fiber identification device which may be used to identify and test optical fibers in accordance with one or more embodiments of the present disclosure.

One such example of a suitable device for reading both the identification signal and the testing signal is a multifiber identifier (MFI) 3, as illustrated in FIG. 3. As illustrated in FIG. 3, the MFI 3 may read the identification signal and the testing signal of a selected one of the plurality of optical fibers, e.g., optical fiber 10 in the illustrated example, at an intermediate point on the optical fiber between the first end and the second end of the optical fiber.

Figure 4:
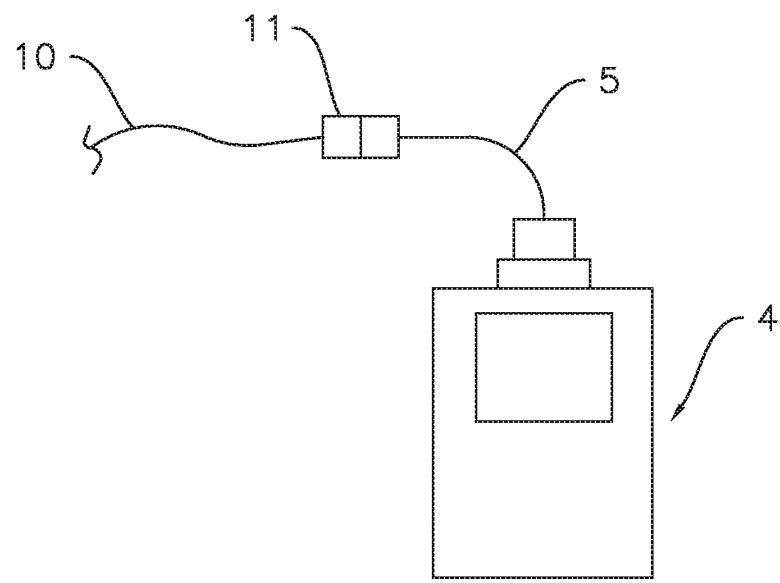
FIG. 4 is a schematic illustration of an exemplary optical power meter device which may be used to identify and test optical fibers in accordance with one or more embodiments of the present disclosure.
Figure 5:
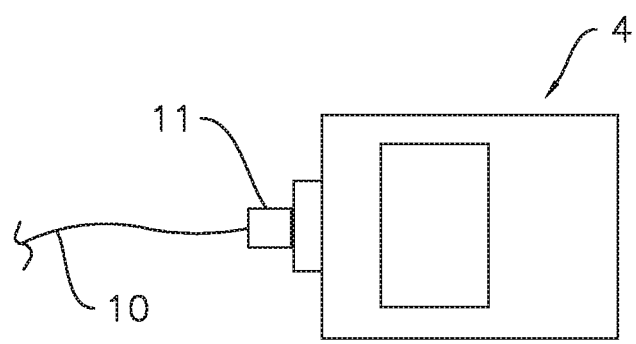
FIG. 5 is a schematic illustration of an exemplary optical power meter device which may be used to identify and test optical fibers in accordance with one or more additional embodiments of the present disclosure.

Another example of a suitable device for reading both the identification signal and the testing signal is an optical power meter (OPM), such as the example OPM 4 illustrated in FIGS. 4 and 5. The OPM 4 is generally operable to detect and measure the power of light at one or more predetermined wavelengths or ranges of wavelengths. In general, an optical power meter such as OPM 4 may convert received light into an electrical signal for measurement and/or display purposes. As illustrated for example in FIG. 4, the OPM 4 may be connected to a jumper 5 which may interconnect the OPM 4 with the connector, e.g., connector 11, on the second end of a selected one of the plurality of optical fibers, e.g., optical fiber 10 as in the illustrated example. In various embodiments, the jumper 5 may be interconnected with the connector 11 with or without making contact with the optical fiber 10, e.g., the connection may be a contact or non-contact connection. Thus, one of ordinary skill in the art will recognize that connecting the jumper 5 to the connector 11 includes placing the optical fiber 10 in optical communication with the OPM 4 and may include but does not necessarily include physically connecting the optical fiber to the OPM 4. In another example, as illustrated in FIG. 5, the OPM 4 may be directly connected to the connector, e.g., connector 11, on the second end of a selected one of the plurality of optical fibers, e.g., optical fiber 10, in order to read the identification signal and the testing signal transmitted through the selected optical fiber, e.g., optical fiber 10 as in the illustrated example. In various embodiments, the direct connection may be a contact or non-contact connection, as described above with respect to the jumper 5 in FIG. 4.

Figure 6:
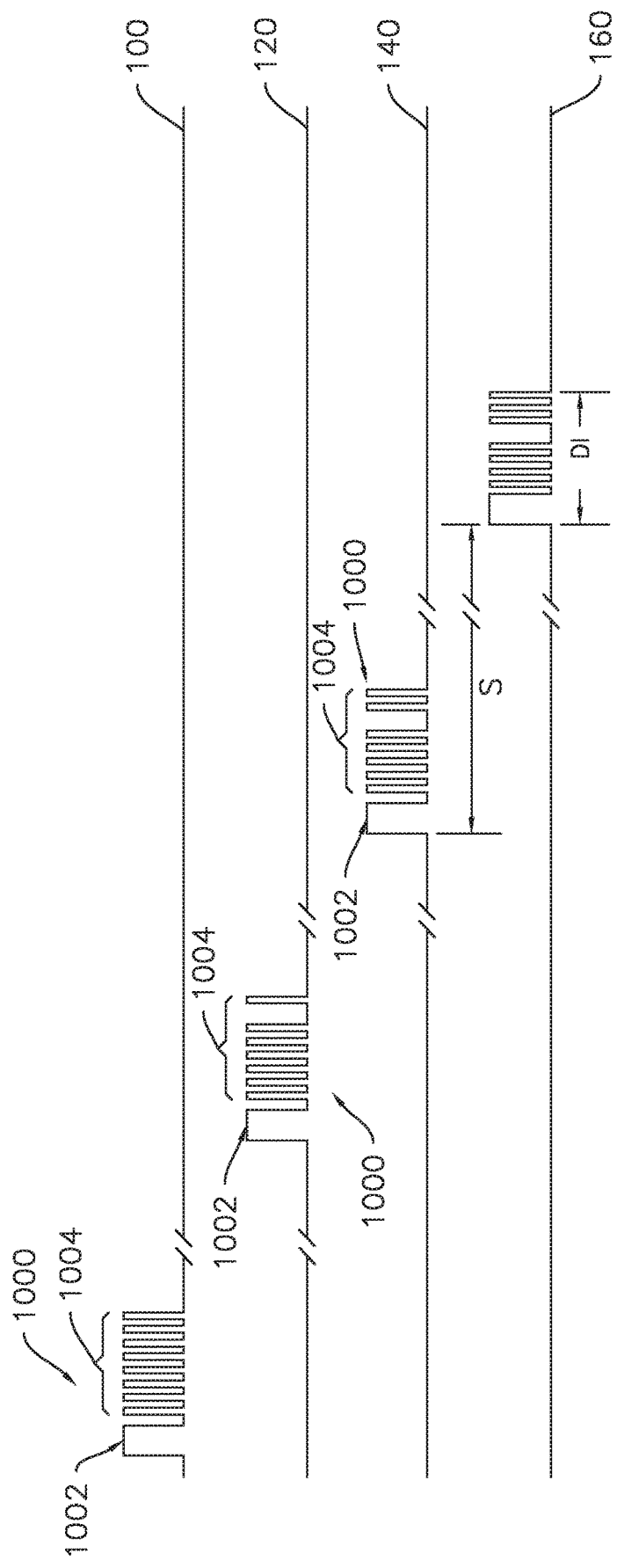
FIG. 6 illustrates a plurality of identification signals according to one or more embodiments of the present subject matter.

The light source, e.g., MFT 1, may include a laser source operable to generate a laser beam of any suitable wavelength. As shown in FIGS. 6 through 9, the light emitted by the light source, e.g., MFT 1, may be laser light emitted in a pattern wherein the pattern forms the identification signal 1000 and the testing signal 2000. For example, FIG. 6 illustrates a plurality of emitted light patterns 100, 120, 140, and 160, each of which includes at least one identification signal 1000. The light patterns 100, 120, 140, and 160 may each be emitted into and transmitted through a respective one of the plurality of optical fibers, e.g. optical fibers 10, 12, 14, and 16. The light patterns may vary from one fiber to another, or the light patterns may be generally the same, e.g., in some embodiments only the identification signals may vary between fibers. The identification signals 1000 may be data bursts 1000 including a start bit 1002 and an identification code 1004. In some embodiments, such as the example embodiment illustrated in FIG. 6, the identification codes 1004 may be eight-bit codes provided in return to zero (RZ) format. Each identification code 1004 may be unique to the respective optical fiber. For example, in the illustrated embodiment of FIG. 6, light pattern 100 includes an identification code 1004 corresponding to 11111111, such that optical fiber 10 may be identified by reading and/or decoding the identification code 1004 of 11111111, light pattern 120 includes an identification code 1004 corresponding to 11111101, such that optical fiber 12 may be identified by reading and/or decoding the identification code 1004 of 11111101, and so forth. As described above, the identification codes 1004 may be read by, e.g., an MFI 2 (FIG. 3) or an OPM 4 (FIGS. 4 and 5).

Each identification signal 1000 may define a duration DI. For example, the duration DI of each identification signal 1000 may be between about two milliseconds (2 ms) and about ten milliseconds (10 ms), such as between about three milliseconds (3 ms) and about five milliseconds (5 ms), such as about four milliseconds (4 ms), for example three and ninety-nine hundredths milliseconds (3.99 ms). The identification signals 1000 may be staggered or offset by a stagger time S between respective start bits 1002. In some embodiments, the stagger time S between consecutive or adjacent signals may be the same throughout the plurality of signals. In other embodiments, variations are possible such that the stagger time S, e.g., between light pattern 100 and light pattern 120 may be different from the stagger time S between light pattern 120 and light pattern 140. The stagger time S may be sufficiently long to avoid or minimize overlapping of the signals 1000, for example, the stagger time S may be sufficiently long that no two lasers are emitting at the same time. For example, the stagger time S may be between about five milliseconds (5 ms) and about twenty-five milliseconds (25 ms), such as between about seven milliseconds (7 ms) and about fifteen milliseconds (15 ms), such as about ten milliseconds (10 ms), for example about ten and four tenths milliseconds (10.4 ms).

Figure 7:
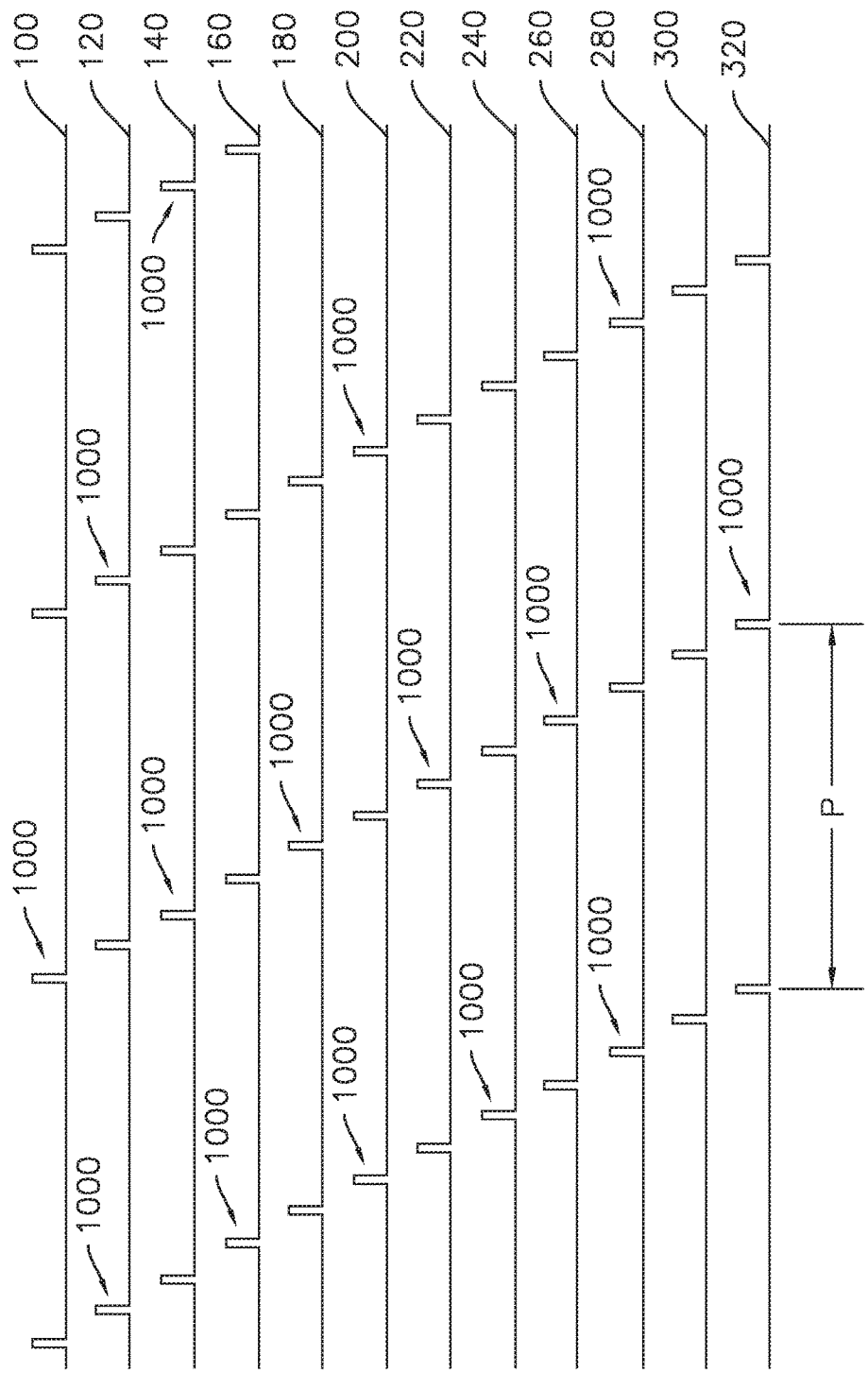
FIG. 7 illustrates a plurality of identification signals according to one or more embodiments of the present subject matter.

FIG. 7 illustrates a plurality of light patterns, e.g., twelve light patterns, as may be used to identify optical fibers of a plurality of optical fibers. For example, FIG. 7 illustrates twelve light patterns 100, 120, 140, 160, 180, 200, 220, 240, 260, 280, 300, and 320, each of which may be emitted into a corresponding optical fiber, e.g., optical fibers 10, 12, 14, 16, 18, 20, 22, 24, 26, 28, 30, and 32, as shown in FIG. 2. As shown in FIG. 7, the light patterns 100, 120, 140, 160, 180, 200, 220, 240, 260, 280, 300, and 320 may be periodic, e.g., each identification signal 1000 may be repeated after a certain period P. The period P may be the same in each light pattern or may vary between light patterns. For example, variations in the period P between light patterns may also provide variations in the stagger time S between signals among the various light patterns. In various embodiments, the period P may be between about fifty milliseconds (50 ms) and about five hundred milliseconds (500 ms), such as between about seventy five milliseconds (75 ms) and about three hundred and fifty milliseconds (350 ms), such as between about one hundred milliseconds (100 ms) and about two hundred milliseconds (200 ms), such as about one hundred twenty five milliseconds (125 ms).

Figure 8:
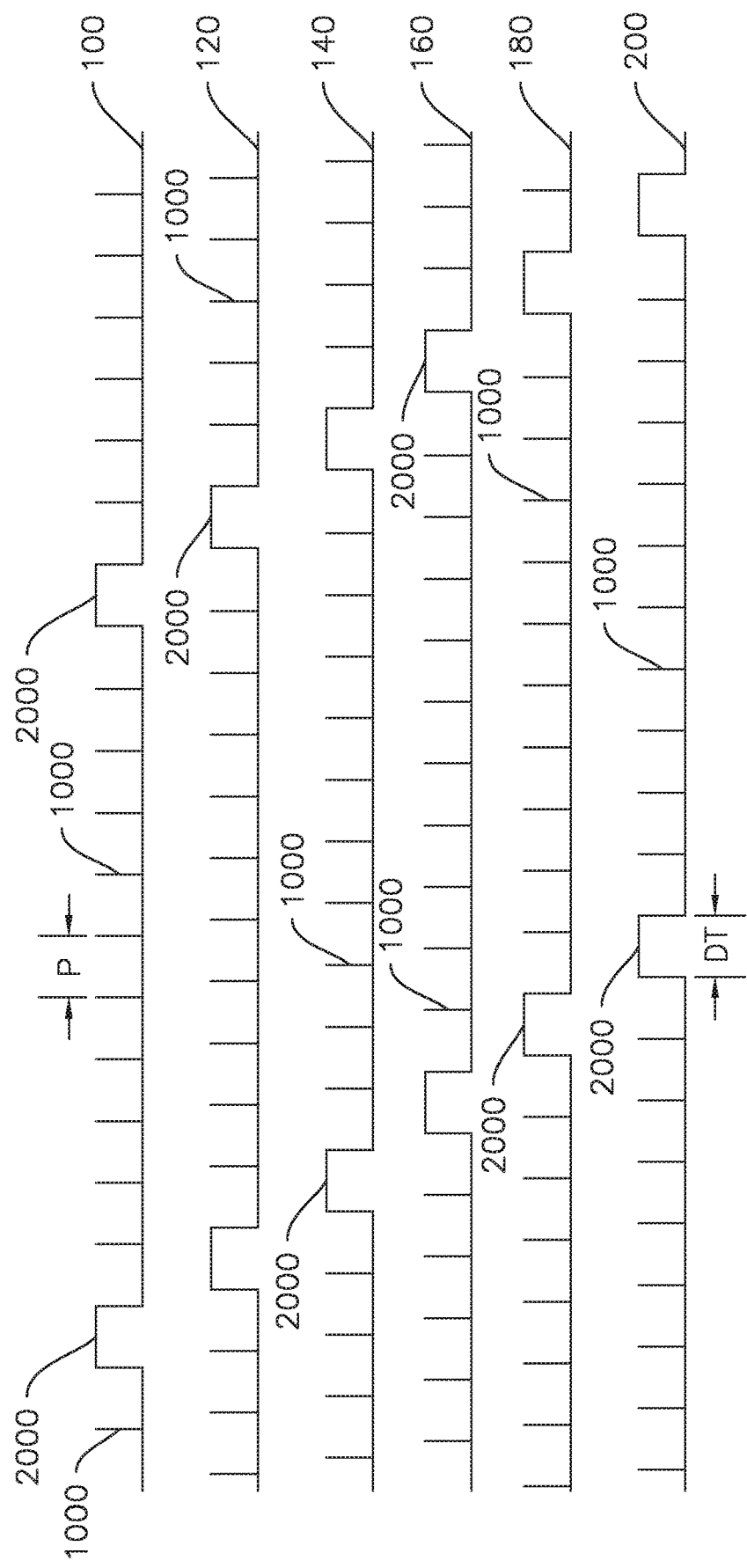
FIG. 8 illustrates a plurality of identification signals and test signals according to one or more embodiments of the present subject matter.
Figure 9:
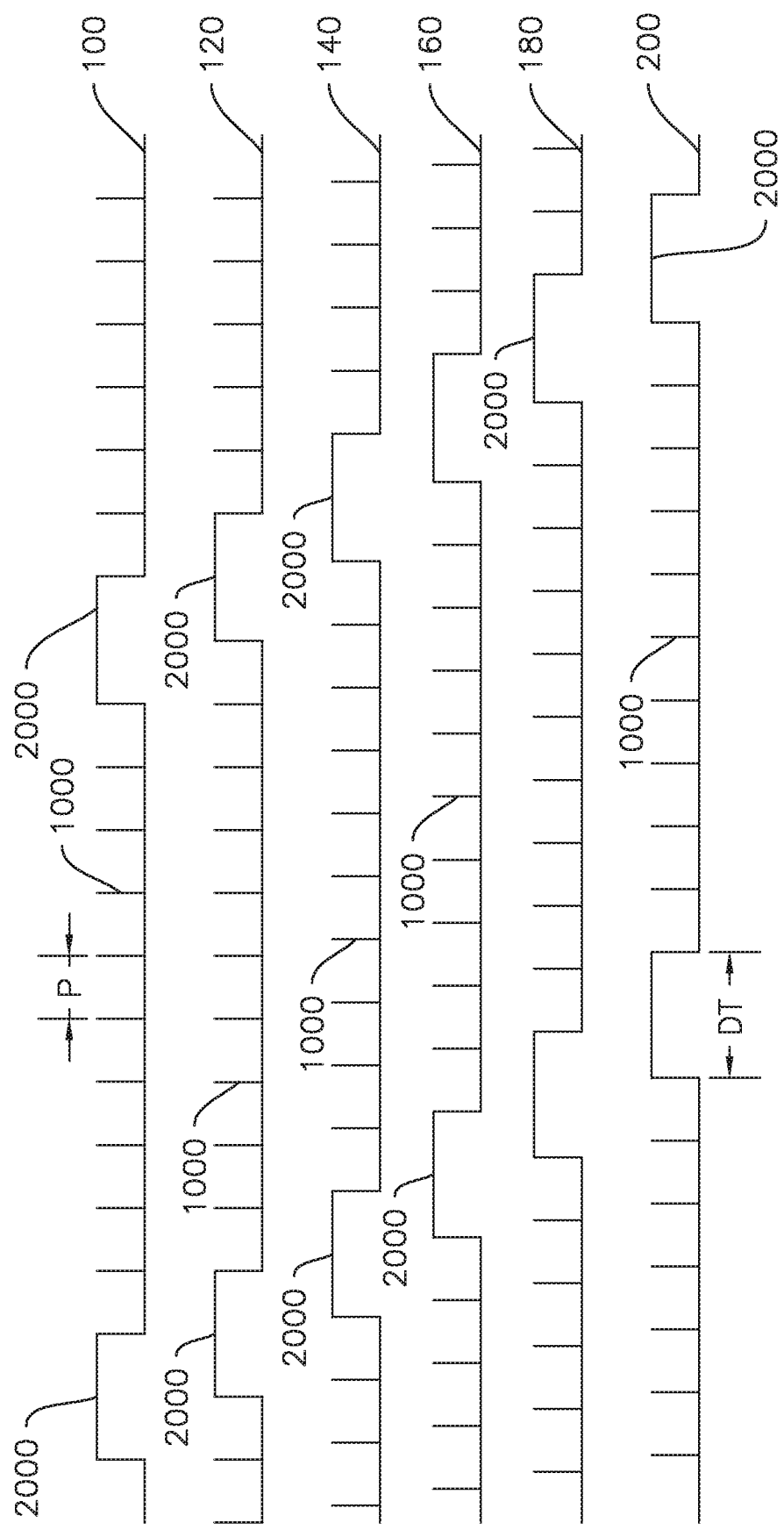
FIG. 9 illustrates a plurality of identification signals and test signals according to one or more additional embodiments of the present subject matter.

FIGS. 8 and 9 illustrate a plurality of light patterns, e.g., six light patterns 100, 120, 140, 160, 180, and 200, as may be used in various exemplary embodiments of the present subject matter. One of ordinary skill in the art will recognize that the six light patterns illustrated in FIGS. 8 and 9 may be used alone or in combination with any suitable number of additional light patterns for testing and identifying any number of optical fibers. For example, the six light patterns illustrated in FIGS. 8 and 9 may be used with six additional light patterns for a total of twelve light patterns corresponding to twelve optical fibers, e.g., optical fibers 10, 12, 14, 16, 18, 20, 22, 24, 26, 28, 30, and 32, as shown in FIG. 2.

As shown in FIGS. 8 and 9, each light pattern includes a periodically repeating identification signal 1000 and a testing signal 2000 intermittently provided within the period of the light pattern. For example, the testing signal 2000 may be provided every eleventh signal, as illustrated in FIG. 8 or every tenth signal, as illustrated in FIG. 9. In various embodiments, the testing signal 2000 may be provided at any suitable interval, such as every fifth signal (or fewer), or every twelfth signal (or more). As shown in FIGS. 8 and 9, the testing signal 2000 may be an unmodulated continuous wave (CW) pulse. The CW pulse may have any suitable wavelength, such as between about one thousand five hundred nanometers (1500 nm) and about one thousand seven hundred nanometers (1700 nm), such as about one thousand six hundred and fifty nanometers (1650 nm), such as about one thousand six hundred and twenty-five nanometers (1625 nm), such as about one thousand five hundred and fifty nanometers (1550 nm). In such embodiments, the single device configured to read the identification signal 1000 and the testing signal 2000 may be configured to determine a power level of the testing signal 2000. For example, the MFI 3 of FIG. 3 or the OPM 4 of FIGS. 4 and 5 may be configured to determine a power level of the testing signal 2000. The power level of the testing signal 200 may be determined by the single device, e.g., MFI 3 or OPM 4, by converting the received testing signal 2000, which is an optical signal, into an electrical signal. The electrical signal may then be communicated to measurement devices which measure the power of the electrical signal, which corresponds to the optical power of the testing signal 2000.

In some embodiments, determining the status of the optical fiber, e.g., in method step 506 (FIG. 1), may include determining a power level of the testing signal 2000, e.g., with the single device, as described above. For example, in some embodiments, the power level may be a relative power level of the testing signal 2000 as compared to a power level of at least one other optical fiber of the plurality of optical fibers, e.g., a second testing signal 2000 of a second optical fiber of the plurality of optical fibers. In other embodiments, the determined power level of the testing signal 2000 may also or instead be compared to an initial power level of the testing signal 2000 as originally emitted from, e.g., the MFT 1, to determine a power loss of the respective optical fiber through which the signal 2000 is transmitted.

Measuring the relative power between individual optical fibers of the plurality of optical fibers to determine the status of the optical fiber(s) may advantageously permit detection of an issue in one or more optical fibers of the plurality of optical fibers. For example, significant differences in the relative power between individual optical fibers may indicate one or more issues such as connector contamination, a macro bend that increases fiber loss, a cable pinch, a damaged fiber (or ribbon, or cable, etc.), as well as other factors which may affect optical loss on an optical fiber. Additionally, measuring relative power between fibers may advantageously reduce or eliminate calibration of the testing device. For example, the absolute power level may not be predetermined, e.g., the need to set a reference power level on the single device, e.g., MFI 3 or OPM 4, may be removed. For example, the measured power level of the testing signal in a first optical fiber of the plurality of optical fibers may be referenced to a second optical fiber of the plurality of optical fibers rather than referenced to the light source. In such embodiments, each testing signal 2000 may include approximately the same power level as every other testing signal 2000. For example, the power levels of the testing signals 2000 in each light pattern 100, 120, 140, 160, 180, 200, 220, 240, 260, 280, 300, and 320 may vary by about one decibel (1 dB) or less, such as about five tenths of a decibel (0.5 dB) or less, such as about two tenths of a decibel (0.2 dB) or less.

As shown in FIGS. 8 and 9, the testing signal 2000 may include or define a testing duration DT. As shown in FIG. 8, the testing duration DT may be about the same as the period P. In other embodiments, the testing duration DT may be longer than the period P. For example, the testing duration DT may be about twice as long as the period P, as illustrated in FIG. 9. In various embodiments, the testing duration DT may be between about fifty milliseconds (50 ms) and about one thousand milliseconds (1000 ms), such as between about seventy five milliseconds (75 ms) and about seven hundred milliseconds (700 ms), such as between about one hundred milliseconds (100 ms) and about four hundred milliseconds (400 ms), such as about one hundred twenty five milliseconds (125 ms), such as about two hundred and fifty milliseconds (250 ms).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of identifying and testing a plurality of optical fibers, the method comprising:
    emitting light into to or more of the plurality of optical fibers, the light comprising identification signals and a common testing signal, wherein the identification signal emitted into each of the two or more optical fibers is unique to each of the two or more optical fibers;
    reading the unique identification signal and the common testing signal emitted into at least one of the two or more optical fibers with a single device;
    determining an identity of the at least one of the optical fibers based on the unique identification signal emitted into the at least one optical fiber with the single device; and
    determining a status of the at least one of the optical fibers based on the common testing signal emitted into the at least one optical fiber with the single device.

2. The method of claim 1, wherein determining the status of the at least one optical fiber comprises determining a power level of the common testing signal in the at least one optical fiber.

3. The method of claim 1, wherein the light is emitted into the plurality of optical fibers at an end of each of the optical fibers and read at an intermediate portion of each of the optical fibers.

4. The method of claim 1, wherein the identification signal comprises a data burst including a start bit and an identification code, and wherein the identification code is unique to each optical fiber of the plurality of optical fibers.

5. The method of claim 1, wherein the single device is an optical power meter.

6. The method of claim 1, wherein the single device is a multifiber identifier.

7. The method of claim 1, wherein the step of emitting comprises emitting the light from a multifiber tracer.

8. The method of claim 1, wherein emitting the light comprises emitting a repeating pattern of the identification signal and the testing signal.

9. The method of claim 8, wherein the repeating pattern comprises emitting a plurality of identification signals between each testing signal.

10. The method of claim 1, wherein the identification signal comprises an eight-bit data pulse.

11. A method of identifying and testing a plurality of optical fibers, the method comprising:
    emitting light into each optical fiber of the plurality of optical fibers, the light comprising an identification signal unique to each respective optical fiber of the plurality of optical fibers and a testing signal common to each of the plurality of optical fibers;
    reading the identification signal and the testing signal with a single device; and
    determining an identity and a status of each optical fiber of the plurality of optical fibers with the single device, wherein the determined identity is based on the unique identification signals emitted into each optical fiber and the determined status is based on the common testing signal.

12. The method of claim 11, wherein determining the status of each optical fiber of the plurality of optical fibers comprises determining a relative power level of the respective testing signal of each optical fiber of the plurality of optical fibers as compared to a power level of a testing signal of at least one other optical fiber of the plurality of optical fibers.

13. The method of claim 11, wherein the single device is an optical power meter.

14. The method of claim 11, wherein the single device is a multifiber identifier.

15. The method of claim 11, wherein the step of emitting comprises emitting the light from a single multifiber tracer.

16. The method of claim 11, wherein emitting the light comprises emitting a repeating pattern of each identification signal and each testing signal into each respective optical fiber of the plurality of optical fibers.

17. The method of claim 16, wherein each repeating pattern comprises emitting a plurality of identification signals between each testing signal of the respective repeating pattern.

18. The method of claim 11, wherein each identification signal comprises an eight-bit data pulse.

* * * * *